(12) United States Patent
Wantiez

(10) Patent No.: US 11,527,831 B2
(45) Date of Patent: Dec. 13, 2022

(54) TRANSMISSION AND/OR RECEPTION OF RADIO SIGNALS

(71) Applicant: NOKIA TECHNOLOGIES OY, Espoo (FI)

(72) Inventor: Eric Wantiez, Le Perry en Yvelines (FR)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 17/186,826

(22) Filed: Feb. 26, 2021

(65) Prior Publication Data
US 2021/0273338 A1    Sep. 2, 2021

(30) Foreign Application Priority Data

Mar. 2, 2020 (EP) .................................... 20160331

(51) Int. Cl.
*H01Q 9/06* (2006.01)
*H01Q 1/12* (2006.01)

(52) U.S. Cl.
CPC ........... *H01Q 9/065* (2013.01); *H01Q 1/1214* (2013.01); *H01Q 1/1221* (2013.01); *H01Q 1/1271* (2013.01)

(58) Field of Classification Search
CPC .... H01Q 9/0407; H01Q 9/065; H01Q 1/1214; H01Q 1/1221; H01Q 1/1271
See application file for complete search history.

(56) References Cited

U.S. PATENT DOCUMENTS

| 2007/0149250 | A1 | 6/2007 | Crozzoli et al. |
| 2009/0231220 | A1 | 9/2009 | Zhang et al. |
| 2012/0014694 | A1 | 1/2012 | Templ et al. |
| 2012/0243579 | A1 | 9/2012 | Premakanthan et al. |
| 2015/0098351 | A1 | 4/2015 | Zavadsky et al. |
| 2017/0034833 | A1 | 2/2017 | Daniel et al. |
| 2017/0086201 | A1 | 3/2017 | Nilsson et al. |
| 2018/0310080 | A1* | 10/2018 | Hoffmann ........ H04B 10/25753 |
| 2018/0351641 | A1* | 12/2018 | Hoffmann .............. G01M 11/00 |

FOREIGN PATENT DOCUMENTS

| CN | 1860645 A | 11/2006 |
| CN | 102680805 A | 9/2012 |
| CN | 102694566 A | 9/2012 |
| CN | 105814821 A | 7/2016 |
| WO | WO 2009/115115 A1 | 9/2009 |
| WO | WO 2018/199526 A1 | 11/2018 |

OTHER PUBLICATIONS

Extended European Search Report for European Application No. 20160331.3 dated Jul. 8, 2020, 9 pages.

(Continued)

*Primary Examiner* — Hoang V Nguyen
(74) *Attorney, Agent, or Firm* — Alston & Bird LLP

(57) ABSTRACT

A remote antenna unit including at least one antenna configured to enable conversion between a digital signal and a radio signal; an external digital interface for providing the digital signal; and means for adapting performance of the antenna in dependence upon measurement of at least one parameter.

20 Claims, 2 Drawing Sheets

(56) References Cited

OTHER PUBLICATIONS

Liang et al., "Microstrip Patch Antennas on Tunable Electromagnetic Band-Gap Substrates", IEEE Transactions on Antennas and Propogation, vol. 57, No. 6, (Jun. 2009), 6 pages.
Pendry et al., "Magentism from Conductors and Enhanced Nonlinear Phenomena", IEEE Transactions on Microwave Theory and Techniques, vol. 47, No. 11 (Nov. 1999), 10 pages.
Office Action for Chinese Application No. 202110226404.2 dated Mar. 18, 2022, 11 pages.
Office Action for Chinese Application No. 202110226404.2 dated Oct. 25, 2022, 10 pages.

* cited by examiner

TRANSMISSION AND/OR RECEPTION OF RADIO SIGNALS

CROSS-REFERENCE TO RELATED APPLICATIONS

This application claims priority to European Patent Application No. 20160331.3, filed Mar. 2, 2020, the entire contents of which are incorporated herein by reference.

TECHNOLOGICAL FIELD

Embodiments of the present disclosure relate to transmission and/or reception of radio signals.

BACKGROUND

Radio transmitters, radio receivers and radio transceivers are complex.

It would be desirable to divide the transmitter/receiver into modules that are remote from one another.

However, because of their complexity this is not straightforward.

BRIEF SUMMARY

According to various, but not necessarily all, embodiments there is provided a remote antenna unit comprising:
at least one antenna configured to enable conversion between a digital signal and a radio signal;
an external digital interface for providing the digital signal;
means for adapting performance of the antenna in dependence upon measurement of at least one parameter.

In some but not necessarily all examples, the digital signal is provided from the external digital interface to the antenna without passing through a digital to analogue converter, or, the digital signal is provided to the external digital interface from the antenna without passing through an analogue to digital converter.

In some but not necessarily all examples, the remote antenna unit comprises only passive components between the external digital interface and the antenna.

In some but not necessarily all examples, the external digital interface is an electrical or optical physical interconnection.

In some but not necessarily all examples, the remote antenna unit is configured to transfer the digital signal between the external digital interface and the antenna, as a constant-amplitude, pulse-width-modulated signal.

In some but not necessarily all examples, the remote antenna unit comprises means for measurement of the at least one parameter and means for adaptation of the antenna in dependence upon the measurement of the at least one parameter.

In some but not necessarily all examples, the measurement is an electric-field dependent measurement indicative of antenna performance.

In some but not necessarily all examples, the antenna is a microstrip antenna.

In some but not necessarily all examples, the antenna is configured for window-mounting.

In some but not necessarily all examples, the remote antenna unit comprises multiple antennas, wherein each antenna is similarly configured to enable conversion between a single-antenna digital signal and a radio signal and wherein the external digital interface is configured to provide a multi-antenna digital signal, the remote antenna unit further comprising means for converting between the multiple parallel single-antenna digital signals and the multi antenna digital signal.

In some but not necessarily all examples, the remote antenna unit comprises means for controlling a complex impedance of the antenna.

In some but not necessarily all examples, the remote antenna unit comprises an electronic bandgap tunable structure.

In some but not necessarily all examples, a system comprises the remote antenna unit and a remote modulation unit, wherein the remote modulation unit comprises:
a first external digital interface for providing digital symbols;
a second external digital interface for providing a modulated digital signal, as the digital signal, between the remote modulation unit and the remote antenna unit; means for converting between digital symbols and a modulated digital signal.

In some but not necessarily all examples, the means for converting between digital symbols and a modulated digital signal uses a codebook to convert between a plurality of symbols and a corresponding modulated signal.

In some but not necessarily all examples, the corresponding modulated signals are constant amplitude, pulse width modulated and pulse position modulated digital signals.

Adapting the performance of the antenna in dependence upon measurement of at least one parameter allows the antenna to operate successfully in different environments. This allows the remote antenna unit to be mobile and differently positioned. The external digital interface enables reliable communication over different interconnections.

According to various, but not necessarily all, embodiments there is provided a remote modulation unit comprising:
a first external digital interface for providing digital symbols;
a second external digital interface for providing a modulated digital signal, as the digital signal, between the remote modulation unit and the remote antenna unit; and means for converting between digital symbols and a modulated digital signal.
wherein the means for converting between digital symbols and a modulated digital signal uses a codebook to convert between a plurality of symbols and a corresponding modulated signal.

According to various, but not necessarily all, embodiments there is provided a remote antenna unit comprising:
at least one antenna;
filter means for conversion between a digital signal and a radio signal for transmission;
an external digital interface for providing the digital signal;
means for adapting performance of the antenna in dependence upon measurement of at least one parameter.

According to various, but not necessarily all, embodiments there is provided examples as claimed in the appended claims.

BRIEF DESCRIPTION

Some example embodiments will now be described with reference to the accompanying drawings in which.

DETAILED DESCRIPTION

Figure 1:
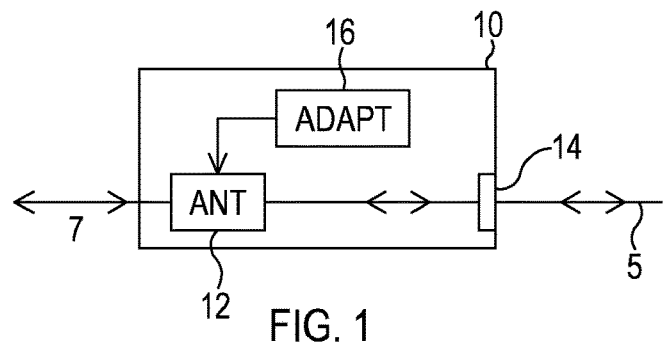
FIG. 1 shows an example embodiment of the subject matter described herein.

FIG. 1 illustrates an example of an apparatus 10. In this example, the apparatus 10 is a remote antenna unit 10.

The apparatus 10 comprises: at least one antenna 12 configured to convert between a digital signal 5 and a radio signal 7; an external digital interface 14 for providing the digital signal 5; control circuitry 16 configured to adapt performance of the antenna 12 in dependence upon measurement of at least one parameter.

The digital interface is external in that it provides an interface, for digital signals, that is external of the apparatus 10.

The apparatus can operate as a transmitter, as a receiver or as a transmitter and receiver (a transceiver).

When operating as a transmitter the antenna 12 is configured to convert or enable conversion of a received digital signal 5, input externally to the external digital interface 14, to a transmitted radio signal 7. In this example, the digital signal 5 can be provided from the external digital interface 14 to the antenna 12 without digital to analogue active component or amplification.

When operating as a receiver the antenna 12 is configured to enable conversion of a received radio signal 7 to a digital signal 5. In some but not necessarily all examples, the digital signal 5 is output externally from the external digital interface 14. In this example, the digital signal 5 can be provided to the external digital interface 14 from the antenna 12 without analogue to digital active component such as an analogue to digital converter (ADC).

In some examples, the remote antenna unit 10 can comprise only passive components between the external digital interface 14 and the antenna 12. An example of a passive component is a filter such as a bandpass filter or low pass filter. An option can be to add an amplifier for transmission to increase transmission power and/or an amplifier for reception to improve sensitivity.

A lowpass or bandpass filtering rejects harmonic frequencies. As per Fourier decomposition, a digital signal (squared) is made of a weighted summation of harmonically related sinusoids. Appropriate filtering rejects harmonics and keeps the fundamental frequency converting a digital signal to an analogue signal.

When the antenna 12 is band selective (includes lowpass or bandpass filter function), the antenna converts a digital signal to an analogue signal providing a form of digital to analogue conversion.

The antenna 12 inherently provides lowpass or bandpass filtering, or comprises a filter that provides lowpass or bandpass filtering.

In this example, the radio signal 7 is communicated via an air interface whereas the digital signal is communicated via a physical interconnection at the external digital interface 14. The external digital interface 14 is, in at least some examples, an electrical or optical physical interconnection. The optical physical interconnection can, for example, be used for medium/long distances. The external digital interface 14 can, for example, be configured to transfer digital signals that have bandwidths greater then 1 GHz or even greater than 10 GHz. Bandwidth is linked to the sampling frequency as Nyquist principle.

Figure 2:
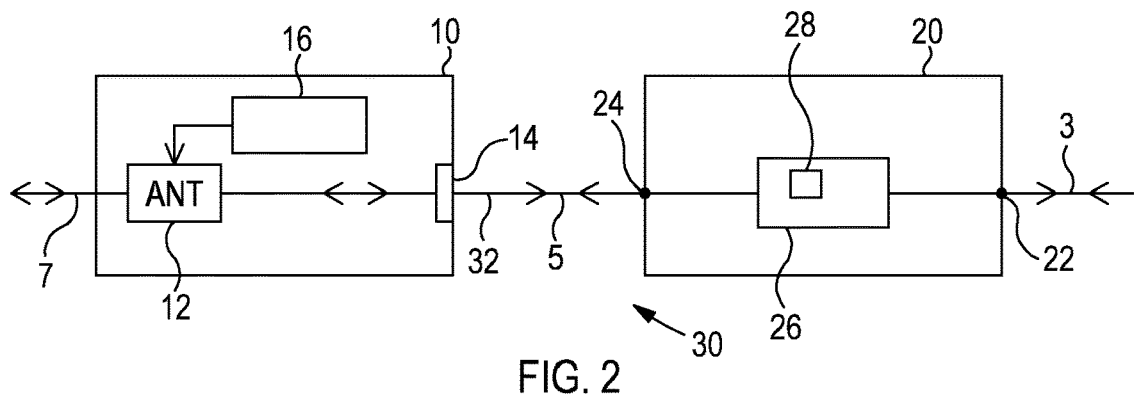
FIG. 2 shows another example embodiment of the subject matter described herein.

FIG. 2 illustrates the apparatus 10 in a system 30.

The system 30 comprises a remote antenna unit 10 as described in this patent application, and a remote modulation unit 20.

In this example, the remote modulation unit 20 comprises:

a first external digital interface 22 for providing digital symbols 3;

a second external digital interface 24 for providing a modulated digital signal, as the digital signal 5; and modulation means 26 for converting between digital symbols 3 and the modulated digital signal (digital signal 5).

The remote antenna unit 10 can operate as a transmitter, as a receiver or as a transmitter and receiver (a transceiver).

When operating as a transmitter, the first external digital interface 22 receives, as an input, digital symbols 3. The modulation means 26 is configured to convert by modulation the digital symbols 3 to modulated digital signals that are output from the second external digital interface 24, as the digital signal 5. The digital signal 5 is transmitted via a physical interconnect 32 to the remote antenna unit 10.

When operating as a receiver, the digital signal 5 can be received at the second external digital interface 24 via a physical interconnect 32 to the remote antenna unit 10. The modulation means 26 is configured to convert by demodulation modulated digital signals, received as the digital signal 5, to digital symbols 3. The first external digital interface 22 transmits, as an output, digital symbols 3.

In at least some examples, the modulation means 26 for converting between digital symbols 3 and a modulated digital signal (the digital signal 5) is an encoder and uses a codebook 28, for example a pulse codebook, to convert between a plurality of RF periods and corresponding modulated signals. One RF period can be represented by pulse stream. The corresponding modulated signals can, for example, be constant amplitude, pulse width modulated signals. The corresponding modulated signals can, for example, be constant amplitude, pulse width modulated and pulse position modulated signals. There can be multiple pulses per RF period. In some examples, the remote antenna unit 10 can comprise a filter (e.g. bandpass filter or lowpass filter) between the external digital interface 14 and the antenna 12 that operates as a reconstruction filter as digital to analogue function for transmission at the antenna.

The digital signal 5 that is transferred between the external digital interface 14 and the antenna 12, is therefore in some examples a constant amplitude, pulse width modulated signal.

The remote modulation unit 20 is not frequency specific.

Figure 3A:
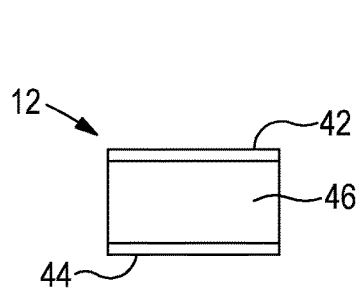
FIG. 3A shows another example embodiment of the subject matter described herein.

FIG. 3A illustrates an example of the antenna 12. In this example the antenna 12 is a patch antenna, for example a microstrip antenna. The antenna 12 comprises, in this example, one or more conductive antenna elements 42 separated from a conductive ground plane 44 by a dielectric substrate 46.

Figure 3B:
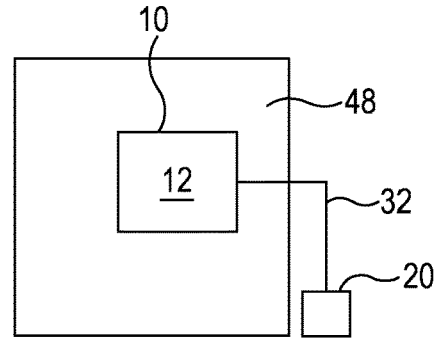
FIG. 3B shows another example embodiment of the subject matter described herein.

FIG. 3B illustrates an example of the antenna 12. In this example, the antenna 12 is configured to be surface mounted on a flat surface. The flat surface can, for example be a flat surface of a window pane 48, for example, an interior surface of the window pane 48 or can, for example, be an exterior surface of the window pane 48.

In some examples, the window pane 48 can form the dielectric 46 of the antenna 12 (see FIG. 3A). In this example, the conductive antenna element(s) 42 can be mounted on one side of the window pane 48 and the conductive ground plane 44 can be mounted on the other side of the window pane 48.

In other examples, the dielectric 46 of the antenna 12 can be flexible (see FIG. 3A). In this example, the combination of the conductive antenna element(s) 42, dielectric 46 and the conductive ground plane 44 can be mounted on one side of the window pane 48. In some examples the combination of the conductive antenna element(s) 42, dielectric 46 and the conductive ground plane 44 can be provided as a flexible film for adhesion to a window pane 48.

The size, shape, transparency and other characteristics of the antenna 12 can be designed and configured to enable mounting of the antenna 12 on a window pane 48. In the example illustrated, the whole of the remote antenna unit is configured to be window-mounted. The interconnect 32 can, in some examples, be designed for window-mounting. The remote modulation unit 20 is not window mounted.

In other examples, the antenna 12 is configured to be surface mounted on a flat surface that is not a window pane such as a wall.

In other examples, the antenna 12 is configured to be mounted on any kind of mounting.

Figures 4A, 4B, 4C:
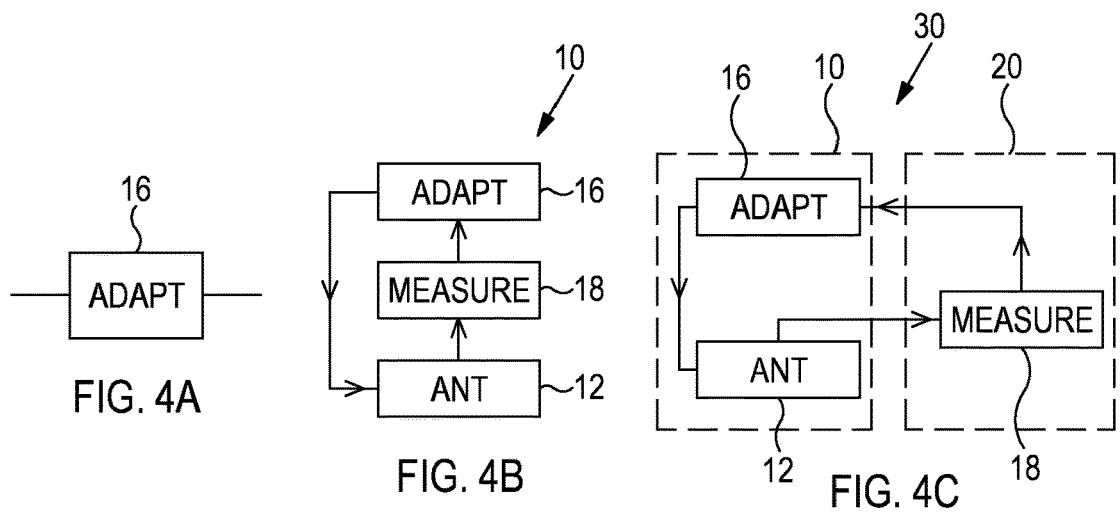
FIG. 4A shows another example embodiment of the subject matter described herein.
FIG. 4B shows another example embodiment of the subject matter described herein.
FIG. 4C shows another example embodiment of the subject matter described herein.

FIGS. 4A, 4B and 4C illustrate different examples of control circuitry 16 configured to adapt performance of the antenna 12 in dependence upon measurement of at least one parameter.

In some examples, an initial measurement of the at least one parameter is used for a one-off adaptation (calibration) of the performance of the antenna 12. In this example, the initial measurement may be performed by an engineer using test equipment. The remote antenna unit 12 and/or the remote modulation unit 20 can be configured to enable the initial measurement.

In some examples, for example, those illustrated in FIGS. 4A, 4B, 4C, measurements, over time, of the at least one parameter are used for a variable adaptation of the performance of the antenna 12. A feedback loop can be established so that a target performance is achieved and maintained. The remote antenna unit 12 and/or the remote modulation unit 20 can be configured to enable the measurements.

The measurement can be an electric-field dependent measurement indicative of performance of the antenna 12. The electric-field dependent measurement can, in some examples, be a measurement performed in respect of a frequency or range of frequencies.

The measurement can, for example, be a measurement of reflected energy from the antenna 12 such as a voltage standing wave ratio (VSWR) or measurement of a dielectric constant adjacent the antenna 12 or measurement of a capacitance associated with the antenna.

In FIG. 4A, the remote antenna unit 10 comprises means 16 for adaptation of the antenna 12 in dependence upon measurement of the at least one parameter.

In FIG. 4B, the remote antenna unit 10 comprises measurement means 18 for measurement of the at least one parameter and means 16 for adaptation of the antenna 12 in dependence upon the measurement of the at least one parameter. There is a closed feedback loop within the remote antenna unit 10.

The remote antenna unit 10 can, for example, receive the digital signal 5 that represents modulated digital symbols and use filtering at the antenna 12 to convert the digital signal 5 to a transmitted radio signal 7. As previously described, lowpass or bandpass filtering rejects harmonic frequencies. As per Fourier decomposition, a digital signal (squared) is made of a weighted summation of harmonically related sinusoids. Appropriate filtering rejects harmonics and keeps the fundamental frequency converting a digital signal to an analogue signal. The measurement means 18 measures at least one electric-field dependent parameter that is dependent upon an efficiency of the antenna 12 at converting the digital signal 5 to a transmitted radio signal 7.

The remote antenna unit 10 can, for example, use the antenna 12 to enable conversion of a radio signal to a digital signal 5. The measurement means 18 measures at least one electric-field dependent parameter that is dependent upon an efficiency of the antenna 12 at enabling conversion of the radio signal 7 to a digital signal 5. On the receive path, an analogue to digital (ADC) function is required and filtering cannot create harmonic sinusoids. In some examples, a sampler and hold function is used. It can be comprised in the digital interface 14 which can be a 1 bit serializer (SERDES) interface. Alternatively, the analogue to digital (ADC) function it can be located in the remote modulation unit. In FIG. 4C, the remote modulation unit 20 comprises measurement means 18 for measurement of the at least one parameter and the remote antenna unit 10 comprises means 16 for adaptation of the antenna 12 in dependence upon the measurement of the at least one parameter. There is a closed feedback loop within the system 30. The remote modulation unit 20 sends information concerning measurement of the at least one parameter to the remote antenna unit 10. The information can be sent via a different interface than the external digital interface 14 or can be sent via the external digital interface 14, multiplexed with the digital signal 5.

The remote antenna unit 10 can, for example, receive the digital signal 5 that represents modulated digital symbols and use the antenna 12 to convert the digital signal 5 to a transmitted radio signal 7. The measurement means 18 measures at least one electric-field dependent parameter that is dependent upon an efficiency of the antenna 12 at converting the digital signal 5 to a transmitted radio signal 7.

The remote antenna unit 10 can, for example, use the antenna 12 to enable conversion of a radio signal 7 to a digital signal 5. The measurement means 18 measures at least one electric-field dependent parameter that is dependent upon an efficiency of the antenna 12 at converting the radio signal 7 to an electrical signal 5.

The digital interface 14 can, for example, comprise three interfaces one for transmission data, one for received data and one for measurement and control.

Figure 5A:
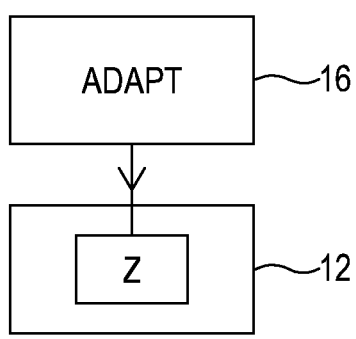
FIG. 5A shows another example embodiment of the subject matter described herein.

FIG. 5A illustrates that in at least some examples, the control circuitry 16 configured to adapt performance of the antenna 12 in dependence upon measurement of at least one parameter, is configured to control a complex impedance within a defined operational frequency bandwidth of the antenna.

Controlling the complex impedance of the antenna 12, tunes the antenna 12. Changing the complex impedance can better match the antenna 12 to its surrounding environment reducing reflections and improving efficiency.

Changing the complex impedance can vary the resonant frequency of the antenna 12.

Changing the complex impedance can vary an operational bandwidth of the antenna 12.

For example, the control circuitry 16 can be configured to control a variable reactance associated with a complex impedance of the antenna 12. The variable reactance can, for example, represent a load on the antenna 12.

The control circuitry 16 can, for example, be configured to vary a physical or electrical length of the antenna 12 using electro-mechanical or electronic switches. The antenna 12 can have multiple different configurations.

Figure 5B:
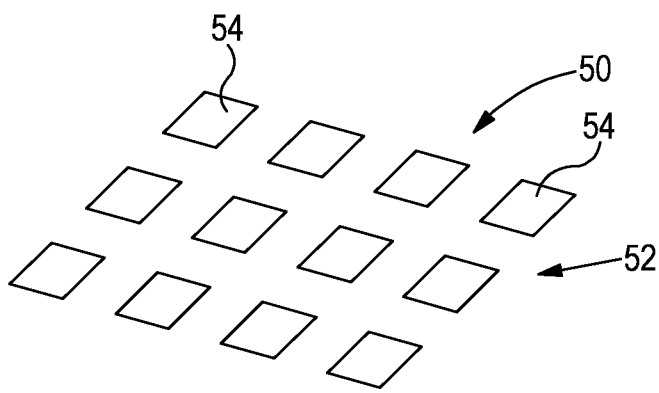
FIG. 5B shows another example embodiment of the subject matter described herein.
Figure 5C:
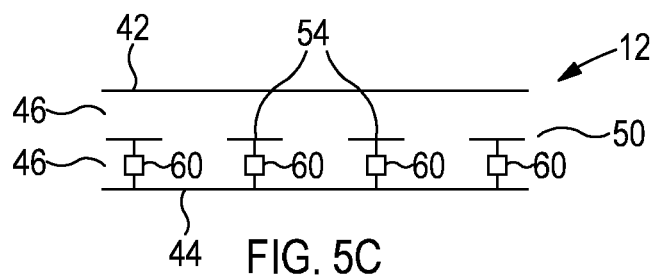
FIG. 5C shows another example embodiment of the subject matter described herein.

FIG. 5C illustrates an example of an antenna 12 comprising an electronic bandgap (EBG) 50.

As illustrated in FIGS. 5B and 5C, the EBG 50 comprises a regular two-dimensional array 52 of conductive elements 54 that is positioned as an intermediate layer between the conductive element(s) 42 of the antenna 12 and the conductive ground plane 44. The conductive elements 54 are periodically spaced in rows and columns. Dielectric material 46 separates the two-dimensional array 52 of conductive elements 54 from the conductive ground plane 44. Dielectric material 46 separates the two-dimensional array 52 of conductive elements 54 from the conductive element(s) 42 of the antenna 12.

Switchable connectors 60 separately interconnect a plurality of the conductive elements 54 to the ground plane 44 through vias in the dielectric 46.

The control circuitry 16 (not shown) controls the electrical characteristics of the connectors 60 and thereby controls the performance of the antenna 12.

The EBG 50 can be used as an electronic bandgap tunable structure. In some examples, the connectors 60 are switched on (high conductance path to ground) or off (high impedance path to ground) by the control circuitry 16 (not shown). In other examples, the connectors 60 are switched to multiple different states, for example different impedances using varactors by the control circuitry 16 (not shown).

In other examples, discrete steps based on switches can be replaced by continuous states based on voltage-controlled component such as PIN diodes for higher accurate control. In this case control circuitry 16 shall include a reconstruction filter as digital to analogue conversion function.

Figure 6:
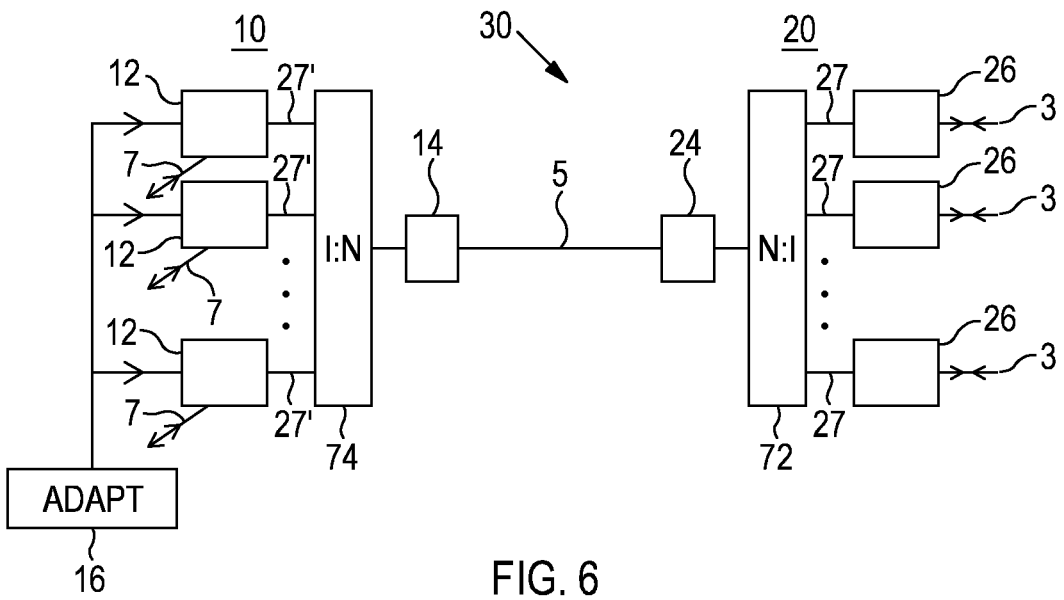
FIG. 6 shows another example embodiment of the subject matter described herein.

FIG. 6 illustrates an example of the system 30 comprising the remote antenna unit 10 and the remote modulation unit 20.

In this example, the remote modulation unit 20 comprises multiple parallel modulation means 26 for converting between digital symbols 3 and the modulated digital signals 27. The conversion means 72 is used to convert between the parallel modulated digital signals 27 and the serial digital signal 5.

In this example, the remote antenna unit 10 comprises conversion means 74 which is configured to convert between the serial digital signal 5 and parallel modulated digital signals 27'; and multiple parallel antennas 12 for converting between the modulated digital signals 27' and radio signals 7.

Each antenna 12 is similarly configured to convert between a single-antenna digital signal 27' and a radio signal 7. The external digital interface 14 is configured to provide a multi-antenna digital signal 5. The remote antenna unit 10 further comprises conversion means 74 for converting between the multiple parallel single-antenna digital signals 27' and the multi antenna digital signal 5. The system 30 is therefore configured for multiple-input multiple output operation (MIMO).

The multiple antennas 12 can be arranged as a regular two-dimensional array enabling massive MIMO.

The operation of the system can be most easily explained as a transmitter, but it can of course be understood to operate 'in reverse' as a receiver.

In some examples, each of the modulation means 26 receives the same symbol stream 3 and is associated with a particular antenna 12. Each modulation means 26 can, for example, introduce a specific phase delay to the modulated digital signal 27' it produces. The phase delays can be selected to cause beam-forming at the array of antennas 12. The phase delay can, for example, be introduced using pulse position modulation. The modulated signals 27, 27' are constant amplitude, pulse width modulated and pulse position modulated digital signals.

The digital interface 14 can, for example, comprise 2N+1 links including one for transmission data for each antenna 12, one for received data for each antenna 12 and one shared link for measurement and control. The links can have dedicated interfaces or can be multiplexed onto one or more shared interfaces.

As used in this application, the term 'circuitry' may refer to one or more or all of the following:

(a) hardware-only circuitry implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions and (c) hardware circuit(s) and or processor(s), such as a microprocessor(s) or a portion of a microprocessor(s), that requires software (e.g. firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor and its (or their) accompanying software and/or firmware. The term circuitry also covers, for example and if applicable to the particular claim element, a baseband integrated circuit for a mobile device or a similar integrated circuit in a server, a cellular network device, or other computing or network device.

Where a structural feature has been described, it may be replaced by means for performing one or more of the functions of the structural feature whether that function or those functions are explicitly or implicitly described.

As used here 'module' refers to a unit or apparatus that excludes certain parts/components that would be added by an end manufacturer or a user. The remote antenna unit 10 can be a module. The remote modulation unit 20 can be a module.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one." or by using "consisting".

In this description, reference has been made to various examples. The description of features or functions in relation to an example indicates that those features or functions are present in that example. The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although embodiments have been described in the preceding paragraphs with reference to various examples, it should be appreciated that modifications to the examples given can be made without departing from the scope of the claims.

Features described in the preceding description may be used in combinations other than the combinations explicitly described above.

Although functions have been described with reference to certain features, those functions may be performable by other features whether described or not.

Although features have been described with reference to certain embodiments, those features may also be present in other embodiments whether described or not.

The term 'a' or 'the' is used in this document with an inclusive not an exclusive meaning. That is any reference to X comprising a/the Y indicates that X may comprise only one Y or may comprise more than one Y unless the context clearly indicates the contrary. If it is intended to use 'a' or 'the' with an exclusive meaning then it will be made clear in the context. In some circumstances the use of 'at least one' or 'one or more' may be used to emphasis an inclusive meaning but the absence of these terms should not be taken to infer and exclusive meaning.

The presence of a feature (or combination of features) in a claim is a reference to that feature or (combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

Whilst endeavoring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

I claim:

1. A remote antenna unit comprising:
at least one antenna configured to enable conversion between a digital signal and a radio signal;
an external digital interface for providing the digital signal; and
control circuitry configured to adapt performance of the at least one antenna in dependence upon measurement of at least one parameter, wherein the measurement of the at least one parameter is received via an interface of the remote antenna unit from a remote modulation unit configured externally from the remote antenna unit.

2. A remote antenna unit as claimed in claim 1, wherein the digital signal is provided from the external digital interface to the at least one antenna without passing through a digital to analogue converter, or, the digital signal is provided to the external digital interface from the at least one antenna without passing through an analogue to digital converter.

3. A remote antenna unit as claimed in claim 1, wherein the remote antenna unit comprises only passive components between the external digital interface and the at least one antenna.

4. A remote antenna unit as claimed in claim 1, wherein the external digital interface is an electrical or optical physical interconnection.

5. A remote antenna unit as claimed in claim 1, configured to transfer the digital signal between the external digital interface and the at least one antenna, as a constant-amplitude, pulse-width-modulated signal.

6. A remote antenna unit as claimed in claim 1, wherein the measurement is an electric-field dependent measurement indicative of antenna performance.

7. A remote antenna unit as claimed in claim 1, wherein the at least one antenna is a microstrip antenna.

8. A remote antenna unit as claimed in claim 1, wherein the at least one antenna is configured for window-mounting.

9. A remote antenna unit as claimed in claim 1, wherein the at least one antenna comprises multiple antennas, wherein each antenna is similarly configured to enable conversion between a single-antenna digital signal and a radio signal and wherein the external digital interface is configured to provide a multi-antenna digital signal, the remote antenna unit further comprising means for converting between the multiple parallel single-antenna digital signals and the multi antenna digital signal.

10. A remote antenna unit as claimed in claim 1, wherein the control circuitry is configured to control a complex impedance of the at least one antenna.

11. A remote antenna unit as claimed in claim 1, comprising an electronic bandgap tunable structure.

12. A system comprising a remote antenna unit, and a remote modulation unit configured externally from the remote antenna unit, wherein the remote antenna unit comprises:
at least one antenna configured to enable conversion between a digital signal and a radio signal;
an external digital interface for providing the digital signal; and
control circuitry configured to adapt performance of the at least one antenna in dependence upon measurement of at least one parameter provided by the remote modulation unit, and wherein the remote modulation unit is configured to provide the measurement of the at least one parameter to the remote antenna unit, and wherein the remote modulation unit comprises:

a first external digital interface for providing digital symbols;

a second external digital interface for providing a modulated digital signal, as the digital signal, between the remote modulation unit and the remote antenna unit; and an encoder for converting between digital symbols and a modulated digital signal.

13. A system as claimed in claim 12 wherein the encoder uses a codebook to convert between a plurality of symbols and a corresponding modulated signal.

14. A system as claimed in claim 13 wherein the corresponding modulated signals are constant amplitude, pulse width modulated and pulse position modulated digital signals.

15. A system as claimed in claim 12, wherein the remote antenna unit comprises only passive components between the external digital interface and the at least one antenna.

16. A system as claimed in claim 12, wherein the measurement is an electric-field dependent measurement indicative of antenna performance.

17. A system as claimed in claim 12, wherein the at least one antenna is a microstrip antenna.

18. A system as claimed in claim 12, wherein the at least one antenna is configured for window-mounting.

19. A system as claimed in claim 12, wherein the at least one antenna comprises multiple antennas, wherein each antenna is similarly configured to enable conversion between a single-antenna digital signal and a radio signal and wherein the external digital interface is configured to provide a multi-antenna digital signal, the remote antenna unit further comprising means for converting between the multiple parallel single-antenna digital signals and the multi antenna digital signal.

20. A system as claimed in claim 12, wherein the control circuitry is configured to control a complex impedance of the at least one antenna.

* * * * *